2,606,277

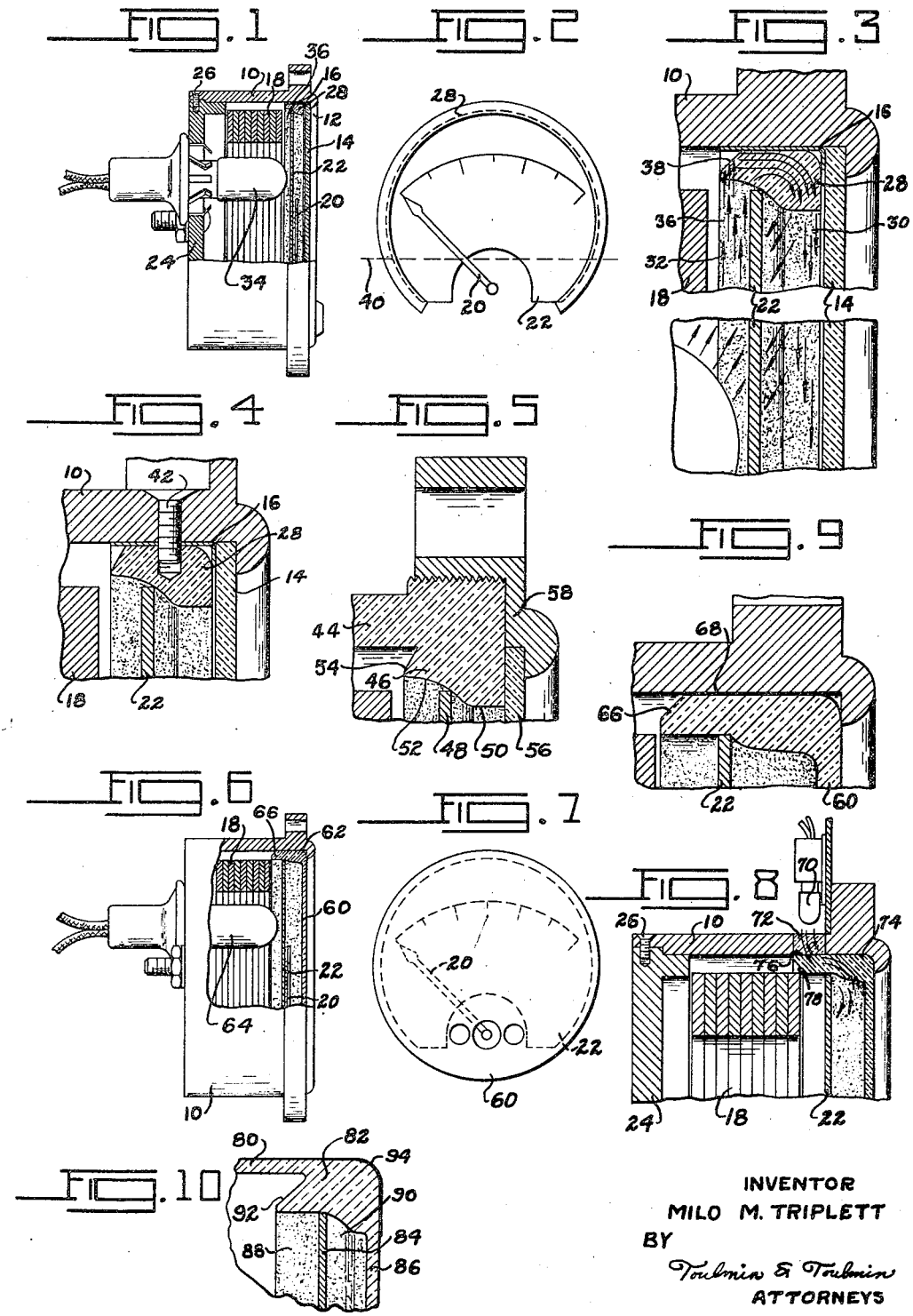
Aug. 5, 1952 — M. M. TRIPLETT — 2,606,277
ILLUMINATING MEANS FOR INSTRUMENT DIALS
Filed Dec. 17, 1947
INVENTOR
MILO M. TRIPLETT
BY
Toulmin & Toulmin
ATTORNEYS Patented Aug. 5, 1952

UNITED STATES PATENT OFFICE 2,606,277

ILLUMINATING MEANS FOR INSTRUMENT DIALS

Milo M. Triplett, Bluffton, Ohio, assignor to The Triplett Electrical Instrument Co., Bluffton, Ohio, a corporation of Ohio Application December 17, 1947, Serial No. 792,247

3 Claims. (Cl. 240—2.1)

This invention relates to indicating instruments having dials, and in particular to an improved means for providing illumination for instrument dials.

In the use of instruments they are often located such that it is necessary to provide additional illumination in order that the readings thereof can be observed.

The proper illuminating of an instrument dial requires that while it is clearly visible, there will be no glare or reflection from the source of illumination which would interfere with the observation thereof.

Accordingly, the primary object of the present invention is to provide an improved arrangement for illuminating the dial on an instrument such that adequate illumination is obtained but without any glare from the illuminating source.

A still further object is the provision of a simple arrangement for illuminating the dial of an instrument such that a minimum of redesigning of the instrument is required and which may, in many cases, be employed with instruments already in use.

A still further object is the provision of an illuminating means for an instrument dial such that the illumination is diffused over the entire area of the dial thereby providing for a uniform effect.

It is also an object of this invention to provide means for illuminating the dial of an instrument and wherein the source of illumination is positioned behind the instrument dial so as to be invisible.

Still another object is to provide means for illuminating a dial on an indicating instrument wherein the source of illumination is positioned outside the instrument proper thereby avoiding affecting the operation thereof due to temperature changes on account of the source of illumination.

Another object is to provide means for illuminating an opaque dial of an instrument.

These and other objects and advantages will become more apparent upon reference to the following description taken in connection with the accompanying drawings in which:

Figure 1 is a vertical section taken through an instrument having a dial illuminating means according to this invention;

Figure 2 is a view looking in at the face of the dial and with the light transmitting member mounted therearound;

Figure 3 is an enlarged view of the upper right hand corner of Figure 1 showing more in detail the arrangement of the dial, the illuminating means therefor, and the manner in which light is conducted from the light source to the face of the dial;

Figure 4 is a view similar to Figure 3 but shows a modified arrangement for retaining the illuminating member in position;

Figure 5 is a fragmentary view showing one manner of forming the illuminating member integrally with the instrument case;

Figure 6 is a view similar to Figure 1 but shows the illuminating member formed integrally with the cover glass for the instrument;

Figure 7 is a front view looking in at the combined illuminating member and cover glass of Figure 6;

Figure 8 is a fragmentary view showing how this invention is adapted for a source of illumination positioned externally of the instrument case;

Figure 9 is a view similar to Figure 6 and illustrates how a part of the surface of the illuminating member can be blocked off by the use of an opaque coating; and Figure 10 is a fragmentary view of still another modification wherein the instrument case and cover glass therefor are integrally formed as a single member.

Referring to the drawings, there is shown an indicating instrument which, for the purposes of illustration, is shown as an electrical device such as an ammeter, voltmeter, or the like.

The instrument comprises a case 10 having an opening 12 at one side and within which is positioned a cover plate or cover glass 14. The cover glass is retained in position by the flanged ring 16 which is pressed into the case behind the glass and on the side thereof opposite the aperture 12.

Mounted within the case 10 is a movement generally indicated at 18 and which may be any of several well known types. No particular type of movement has been illustrated but it will be understood that it could be of the moving coil type, or the iron vane type, or any other suitable mechanism for actuating the pointer 20 in its movements over the dial 22.

The instrument movement is supported on a rear panel member 24 which is secured in the case 10 as by the screws 26.

For illuminating the face of the dial 22 there is mounted around the periphery thereof an annular member 28 which projects both forwardly and rearwardly from the said dial. The portion which projects forwardly from the dial has a light emitting surface thereon as indicated at 30 in Figure 3 and which is generally inclined to form an acute angle with the front face of the dial.

It will be apparent that light emitted from the surface 30 will be directed toward and across the face of the dial. The portion of the member 28 which extends to the rear of the dial includes a surface 32. This surface extends around the inner periphery of the member and is adapted for absorbing light.

As will be observed in Figure 1 there is a lamp bulb 34 or some other suitable source of illumination mounted on the back panel 24 and extending toward the dial so as to direct light toward the light absorbing surface 32 of the annular member 28.

In the construction shown in Figure 1 there is a relatively narrow space 36 between the rear of the dial and the front face of the magnet forming a part of the instrument movement so that the light rays passing from the bulb 34 to the surface 32 are substantially radial. It will be understood, however, that it is not essential for the said light rays to be projected in a radial direction toward the light absorbing surface member 28, but they may be directed thereto from substantially any direction.

The annular member 28 is formed of any suitable light conductive material such as glass or any of several plastic materials and is characterized by its ability to conduct light from the light absorbing surface 32 to the light absorbing surface 30 and to emit it from the latter.

In order to enhance the light conducting action of the member 28 it includes a beveled part 38 extending peripherally therearound and on the opposite side thereof from the light absorbing surface 32. Light rays which have a tendency to pass radially through the member 28 after being received therein through the surface 32 will thus be reflected toward the front part of the member from whence they emerge through the surface 30.

In order to prevent loss of light through the parts of the surface of the member 28 which do not form the light absorbing or light emitting areas thereof, the said members preferably are polished to a fairly high degree over all of the surface except the said absorbing and emitting areas. These areas are preferably slightly roughened as by sand blasting, etching or molding in order to improve their operating efficiency.

As will be seen in Figure 2 the lower part of the annular member 28 is cut away and this is for the purpose of accommodating parts of the instrument movement such as the zero adjuster, but it will be understood that under certain circumstances the member 28 could be a complete ring if desired.

Inasmuch as the lower part of the instrument is shrouded by a front panel on the case 10 which extends upwardly to about the level indicated by the line 40 on Figure 2, the notching out of the member 28 does not detract from its efficiency as a dial illuminating means.

In the arrangement shown in Figure 4 substantially the same construction is illustrated as is shown in Figure 3 except that the annular member 28 is retained in position by a screw 42. This more rigidly fixes the ring in place and permits it to be used, if desired, as a bezel member for retaining the cover plate 14 in position.

Inasmuch as the case of the instrument is generally formed of an electrical insulating material, it may be formed integrally with the illuminating member if desired. Thus, in Figure 5 the instrument case 44 will be seen to have an inwardly extending peripheral part 46 which lays across the edge of the dial 48 so as to include a light emitting surface 50 ahead of the dial and a light absorbing surface 52 to the rear of the dial. As in the case of the arrangement shown in Figure 3 the illuminating device in Figure 5 also includes a polished beveled part 54 opposite the light absorbing surface 52.

The cover plate 56 in Figure 5 is retained in position by an external bezel ring 58 which is threaded to the case 44 and which also forms the mounting flange for supporting the instrument in a panel.

While the illuminating member extending around the edge of the dial can be either translucent or transparent as desired, it will customarily be formed of a transparent substance because this will give greater efficiency of light conduction. For this reason it is possible to form the illuminating member and the cover glass for the instrument as a single member as shown in Figures 6 and 7. In these figures the cover glass is indicated at 60 and the illuminating portion thereof at 62. The illuminating portion is substantially identical with that already described in connection with Figures 3 and 5 and will be seen to extend over the edge of the dial so as to have a part to the rear thereof to be illuminated by the limit 64 and a part to the front thereof to emit light to the face of the dial.

As in the case of the arrangements discussed in connection with Figures 3 and 5, the illuminating member in Figure 6 also has a beveled part 66 for reflecting light toward the front of the dial.

With the arrangement shown in Figures 6 and 7 it is preferable that the outer peripheral part of the combined illuminating member and cover glass be made opaque by a suitable shroud member or opaque coating as indicated at 68 in Figure 9. This prevents stray illumination from detracting from the effectiveness of the illumination supplied to the face of the dial.

Some instrument installations must give very accurate readings and because of this it may be undesirable to place the source of illumination within the instrument case. In this event the construction illustrated in Figure 8 may be employed wherein the source of illumination 70 is mounted externally of the instrument case and adjacent a transparent or translucent window 72 in the said case. The window 72 is positioned to be adjacent the light absorbing end of the illuminating member 74 for the instrument dial so that light passing through the instrument will be conducted through the illuminating member and to the face of the dial.

Inasmuch as the direction of travel of light into the light absorbing end of the illuminating member is opposite to that illustrated in the other modifications, the light absorbing surface of the said member is on the outer peripheral part thereof as indicated at 76. Similarly, the polished beveled part opposite the light absorbing area is on the inner periphery of the member and is indicated at 78.

Should it be so desired, the entire instrument case and cover glass therefor can be molded as a single integral part. This, in effect, is a combination of the arrangement shown in Figure 5 with that shown in Figure 6. This type of construction is shown in Figure 10 wherein the instrument case 80 is integral with the illuminating member 82 for the dial 84 and also with the dial glass 86. This construction of the illuminating member is substantially identical with that explained in connection with the other modifications and includes a light absorbing area 88, a light emitting area 90, and a polished bevel part 92.

As in the case of the arrangements of Figures 5 and 9, the outer part of the instrument case is preferably shrouded by an opaque member or by an opaque coating as indicated at 94. This coating preferably extends over a portion of the front part of the arrangement shown so as to define a window area through which the dial can be observed. The front part of the shrouding also prevents stray illumination from detracting from the efficiency of the dial illuminating arrangement.

From the foregoing it will be seen that this invention provides for an improved arrangement for illuminating an instrument dial. The construction of this invention is relatively simple and retains substantially standard instrument parts throughout with the exception of the source of illumination and illuminating member extending around the periphery of the dial and the combinations of the said member with the instrument case and dial glass when so desired. The illumination of the dial is substantially uniform over the greater part of the area thereof and is diffused so as to give a soft light and to eliminate all glare.

It will be understood that this invention is susceptible to modification in order to adapt it to diffeernt usages and conditions and, accordingly, it is desired to comprehend such modifications within this invention as may fall within the scope of the appended claims.

I claim:

1. An indicating instrument comprising a casing having a light transmitting aperture therein, a source of illumination arranged in said casing for lighting said aperture, a dial disposed in said casing adjacent to said light source, an annularly shaped light transmitting member between the casing and said dial, said light transmitting member being disposed adjacent the edge of said dial and extending around a major portion thereof, said light transmitting member having a light absorbing surface on the same side of said dial as said light source and a light emitting surface on the opposite side of said dial for the passage of light waves therethrough from the light source side to the face of said dial, said light emitting surface being inclined to form an acute open-space angle with said face of the dial.

2. An indicating instrument comprising a casing having a light transmitting aperture therein, a source of illumination arranged in said casing for lighting said aperture, a dial disposed in said casing adjacent to said light source, an annularly shaped light transmitting member between the casing and said dial, said light transmitting member being disposed adjacent the edge of said dial and extending around a major portion thereof, said light transmitting member having a light absorbing surface on the same side of said dial as said light source and a light emitting surface on the opposite side of said dial for the passage of light waves therethrough from the light source side to the face of said dial, said light emitting surface extending slightly downwardly along said face of the dial and then inclined outwardly therefrom forming an acute open-space angle therewith.

3. An indicating instrument comprising a casing having a light transmitting aperture therein, a source of illumination arranged in said casing for lighting said aperture, a dial disposed in said casing adjacent to said light source, an annularly shaped light transmitting member between the casing and said dial, said light transmitting member being disposed adjacent the edge of said dial and extending around a major portion thereof, said light transmitting member having a light absorbing surface on the same side of said dial as said light source and a light emitting surface on the opposite side of said dial for the passage of light waves therethrough from the light source side to the face of said dial, said light emitting surface being inclined to form an acute open-space angle with said face of the dial, said light transmitting member having a beveled surface extending around the periphery thereof on the side of the member adjacent to the light source for reflecting light waves to said light emitting surface.

MILO M. TRIPLETT.

REFERENCES CITED

The following references are of record in the file of this patent:

UNITED STATES PATENTS

| Number | Name | Date |
|---|---|---|
| 2,062,883 | Hobbs | Dec. 1, 1936 |
| 2,140,972 | Rylsky | Dec. 20, 1938 |
| 2,202,142 | Carter | May 28, 1940 |
| 2,290,284 | Klein et al. | July 21, 1942 |
| 2,317,182 | Dickson et al. | Apr. 20, 1943 |
| 2,411,306 | Van Gaasbeek | Nov. 19, 1946 |
| 2,413,848 | Simpson | Jan. 7, 1947 |
| 2,426,713 | Simpson | Sept. 2, 1947 |
| 2,507,035 | Maynard | May 9, 1950 |